July 11, 1933.   R. G. WULFF   1,917,627
PROCESS OF PRODUCING ACETYLENE GAS
Original Filed Jan. 11, 1927    2 Sheets-Sheet 2
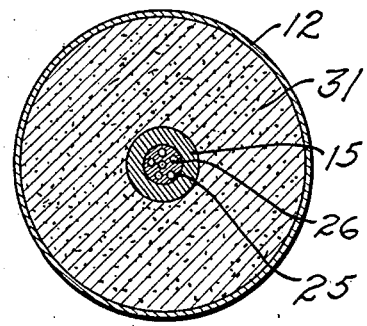
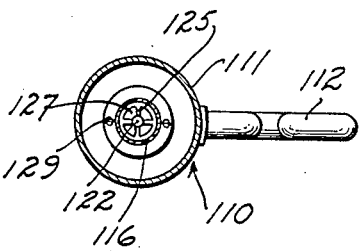
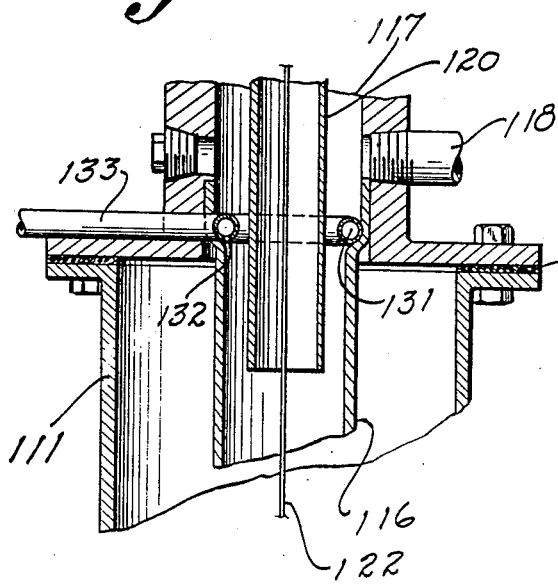
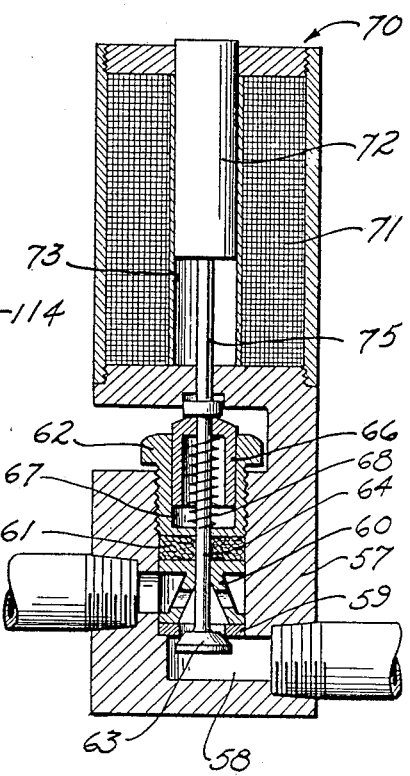

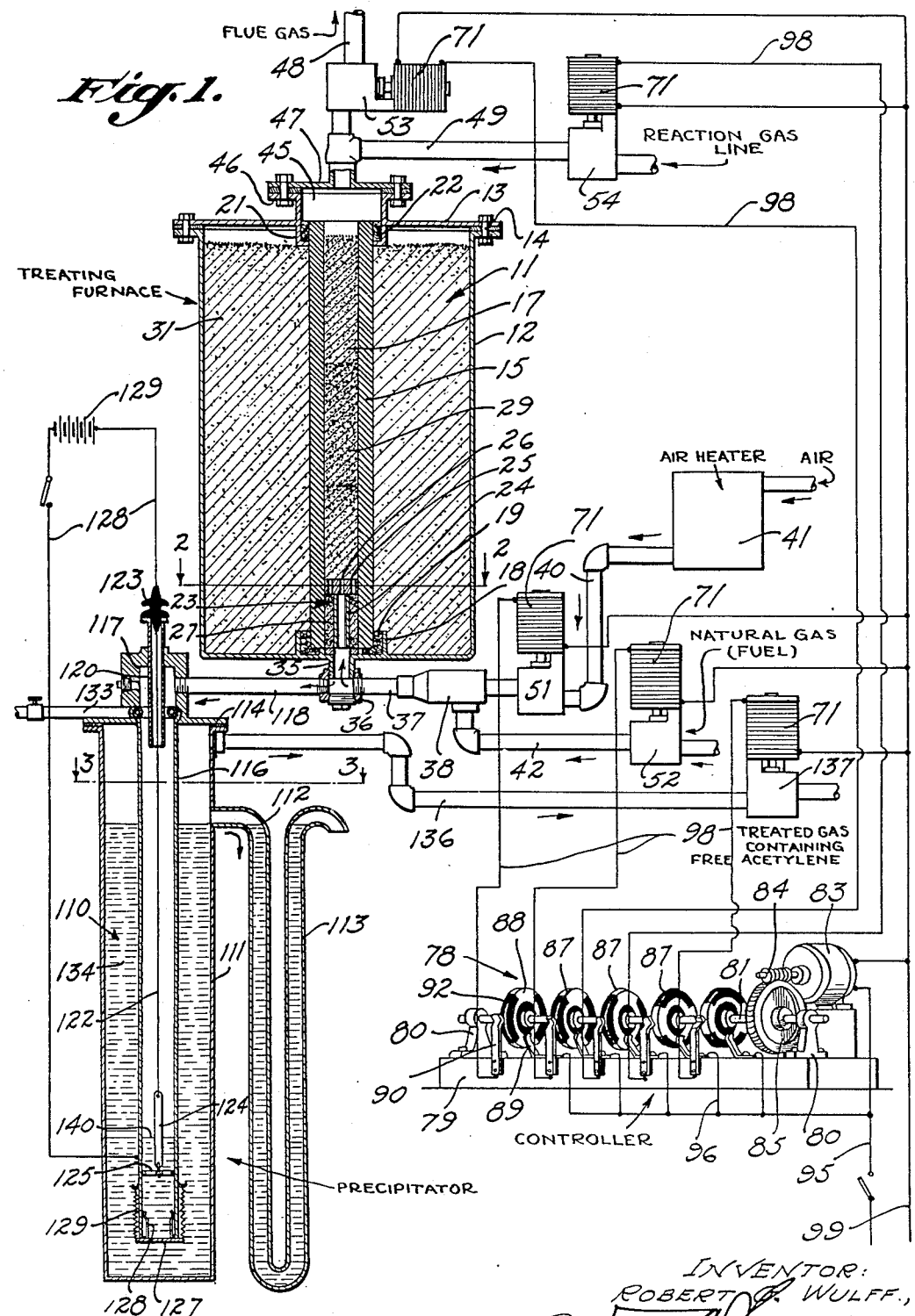

Patented July 11, 1933

1,917,627

UNITED STATES PATENT OFFICE

ROBERT G. WULFF, OF LOS ANGELES, CALIFORNIA

PROCESS OF PRODUCING ACETYLENE GAS

Application filed January 11, 1927, Serial No. 160,341. Renewed December 12, 1932.

This invention relates to the production of acetylene gas and particularly to a method of and apparatus for producing acetylene gas.

At the present time the only commercial method of making acetylene gas is from calcium carbide. Calcium carbide is a product of lime and carbon which have been caused to react by a high temperature heat. The carbide is shipped to the place where the gas is to be generated and is placed in a common form of acetylene generator. The carbide in the generator is contacted with water which produces a chemical reaction and releases acetylene gas.

I have found that hydrocarbons, such as natural gas, are capable of being treated so that acetylene gas $C_2H_2$ may be produced. Natural gas is available in large quantities and at a low cost, thus being a favorable raw material from which to obtain acetylene gas.

It is an object of this invention to provide a method of and apparatus for producing acetylene gas from natural gas.

It is a further object of the invention to provide a process of obtaining acetylene gas from a hydrocarbonaceous gas by passing the gas into contact with a mass of highly heated particles.

Other objects and advantages of the invention will be made evident hereinafter.

Referring to the two drawings in which I illustrate a preferred apparatus of my invention:

Fig. 1 is a vertical view, partly sectioned, diagrammatically showing a complete apparatus.

Fig. 2 is a section taken on the line 2—2 of Fig. 1.

Fig. 3 is a section taken on the line 3—3 of Fig. 1.

Fig. 4 is an enlarged fragmentary section of the upper end of a precipitator of the invention.

Fig. 5 is a vertical section through a valve construction of the invention.

Referring particularly to Fig. 1, the invention includes a furnace 11 which is shown in cross-section in this figure. The furnace 11 includes a shell 12 having a cover 13 secured thereto by bolts 14 in air-tight relationship therewith, thus providing an air-tight space within the shell 12. Extended vertically through the shell is a cylindrical tube 15 which is preferably formed from fired carborundum. The tube 15 provides a cylindrical treating space indicated by the numeral 17. The lower end of the tube 15 rests within a collar 18 and is surrounded by packing 19 which may be asbestos or an equivalent material, which provides a tight seal. The upper end of the tube 15 extends inside a collar 21 and is surrounded by packing 22 which forms a tight seal. The purpose of the packing means illustrated is to permit a relative expansion and contraction between the tube 15 and the shell 12 so that no undue strains will be placed on either of the parts. At the lower end of the tube 15 is a burner structure 23 which has a sleeve 24 placed on the axis of the tube 15. The sleeve 24 is preferably made from fused silica. Resting on the upper end of the sleeve 24 is a plate 25 having screen openings 26 formed vertically therethrough. The plate 25 is formed from fired carborundum. Surrounding the sleeve 24 is insulation 27 which is preferably silica powder. Placed in the chamber 17 are heating and contacting particles 29. The heating and contacting particles 29 are formed from carborundum crystals and are preferably of very small size. However, particles of any material capable of withstanding the high temperature can be used, so long as these particles do not harmfully affect or prevent the forming of the acetylene. At the lower end of the chamber 17 the particles are four mesh or smaller, at the central part of the chamber 17 they may be slightly larger, say, about three mesh, and at the upper end of the chamber 17 they may be three mesh or slightly smaller. The difference in size of the particles at different parts is optional and may be varied according to judgment. The space in the shell 12 surrounding the tube 15 is filled with insulation 31 which is preferably silica powder. The purpose of the silica powder is not only to lessen dissipation of heat, but also to support the tube 15. The silica powder packs around the tube 15.

The bottom of the shell 12 has a nipple 35 which is in communication with the lower end of the sleeve 24. Secured to the nipple 35 is a fitting 36 by means of which a combustible mixture supply line 37 is connected to the chamber 17. Attached to the combustible mixture supply line 37 is a mixer 38 which is of conventional construction. Mixers for gas and air are well known in the art, and the details thereof need not be elucidated here. Attached to the mixer 38 is an air-line 40, and connected in the air-line 40 is an air heater 41. The air heater 41 may be of any suitable standard design. Also connected to the mixer 38 is a fuel gas-line 42. The upper end of the chamber 17 connects to a space 45 formed by a projection 46 and a cover-plate 47. Connected to the cover-plate 47, so as to communicate with the space 45, is a flue gas-line 48. Connected to the flue gas-line 48, adjacent to the cover-plate 47, is a reaction gas-line 49.

Flows of gas through the various gas-lines are controlled by solenoid-operated valves. The air-line 40 has a valve 51, the fuel gas-line 42 has a valve 52, the flue gas-line 48 has a valve 53, and the reaction gas-line 49 has a valve 54.

The valves 51 to 54 inclusive are typically illustrated in Fig. 5. Referring to this figure, the numeral 57 represents a body having a passage 58 formed therethrough to which the pipe-line is connected. Near the central part of the passage 58 is a seat 59 above which is placed a lantern or cage 60. Packing 61 is forced downward against the lantern 60 by means of a nut or gland 62. A valve 63 is adapted to engage the seat 59 and thus close the passage 58. A stem 64 of the valve 63 extends upward through the lantern, packing, and gland, and has a thimble 66 secured to the upper end thereof, the thimble 66 resting in a cavity 67 of the gland 62. Compressed between the thimble 66 and the lower part of the gland 62 is a spring 68 which ordinarily holds the valve 63 against the seat 59 so as to close the passage 58. Supported above the construction just mentioned is a solenoid 70 having a solenoid coil 71 and an armature 72 which rests in a central opening 73 of the solenoid coil 71. The armature 72 is made from iron and has a shaft 75 extending downward into engagement with the thimble 66. When the solenoid is energized, the armature 72 is moved downward into the central part of the solenoid coil 71 and the thimble 66 is depressed. This will force the valve 63 downward from engagement with the seat 59 and open the passage 58.

For the purpose of controlling the operation of the valves I provide a controller 78, diagrammatically illustrated in Fig. 1. The controller 78 has a base 79 which supports bearings 80. Rotatably carried by the bearings 80 is a main shaft 81 which is rotated by a drive means consisting of a motor 83, a worm 84, and a worm-wheel 85, which worm-wheel 85 is connected to the main shaft 81. Supported by the main shaft 81 is a plurality of disc contacts 87 which are insulated from the shaft as illustrated. Each disc contact has a metallic portion 88 which is at all times engaged by a contact finger 89, and which is intermittently engaged by a contact finger 90 as the main shaft 81 is rotated. It should be seen that as each disc rotates, the contact finger 90 first engages the metallic portion 88 and then an insulation part 92.

The valves and the controller 87 are connected in an electric circuit as follows: A conductor 95 is connected to the motor 83, as shown, and it is connected to each contact finger 89 by means of branch conductors 96. Each contact finger 90 is connected to the solenoid coil 71 of a valve by means of a conductor 98. Each solenoid coil 71 and the motor 83 are connected to a conductor 99.

A precipitator 110 of my invention is illustrated in Figs. 1, 3 and 4. The precipitator 110 has a metal tank 111 to which a water-sealed outlet 112 is connected near the upper end thereof. The water-sealed outlet 112 has a U tube portion 113 in which a body of water may collect in order to form a seal. Extended into the tank 111 from a cover 114 thereof is a steel tube 116 which forms an outer electrode of the precipitator. Formed at the upper end of the precipitator above the tank 111 and in communication with the upper end of the steel tube 116 is a dome 117 to which a pipe 118 is connected, the pipe 118 being also connected to the fitting 36. Extended through the dome 117 into the upper end of the steel tube 116 is a protector tube 120 which is preferably made from fused silica which is non-carburizing. Extended into the steel tube or electrode 116 through the protector tube 120 is a central wire electrode 122. The upper end of the wire electrode 122 is supported by an insulator 123 which is carried at the upper end of the protector tube 120. The lower end of the wire electrode 122 is attached to an insulator in the form of a bar 124. The lower end of the insulator 124 is attached to a spider 125 which is supported inside the steel tube 116 near the lower end thereof. The steel tube electrode 116 and the wire electrode 122 are connected in an electric circuit 128 having a source of energy 129. When the circuit just mentioned is completed, an electric field is established between the electrodes, a corona around the wire electrode 122 being produced. The lower end of the steel tube 116 is provided with a valve in the form of a plate 127 which is centralized by fingers 128 and resiliently retained against the bottom of the tube by coil springs 129. As illustrated best in Fig. 4 a wash-fluid ring 131 is retained in the upper end of the steel tube 116. The wash-fluid ring 131 surrounds the protector tube 120 and has downward-directed openings 132 which direct wash-fluid along the interior surface of the steel tube 116. Connected to the wash-fluid ring 131 is a pipe 133. Connected to the upper part of the tank 111, well above the level of a body of wash-fluid 134 therein, is a treated gas delivery line 136 having a solenoid-operated valve 137 which is the same construction as any of the valves 51 to 54 inclusive which have already been described. The valve 137 is connected to the controller 78 in the same manner and is operated in the same manner as the other valves. The treated gas delivery line may be extended to a gas holder or to an apparatus for recovering acetylene from the treated gas.

The method of my invention is as follows:

In starting up the apparatus the valves 51, 52 and 53 are open and the valves 54 and 137 are closed. The positions of these different valves are determined by the controller 78. In the drawings the valves 51, 52 and 53 would be closed since the contact fingers 90 in the circuit of the solenoids of these valves engage the insulation parts 92 of their respective disc contacts 88. Fig. 1, therefore, illustrates the invention at a different period in the operation of the apparatus. The valves 51 and 52, being open, supply air and fuel gas through the pipes 40 and 42 respectively. The air in passing through the heater 41 is raised in temperature. The fuel gas is preferably a natural gas which is obtained from the same source as the gas from which the acetylene gas is to be made. The proportions of air and fuel gas, which I prefer to use, are twelve volumes of air to one volume of fuel gas, being the proportion for complete combustion of the fuel gas used. The gas and the air pass into the mixer 38 where they are thoroughly mixed and where a completely combustible mixture is obtained. The combustible mixture passes through the combustible mixture supply line 37 and through the burner structure 23 into the chamber 17. The combustible mixture flows upward through the flue gas-line 48 and is lighted where it issues therefrom. The flame will burn back into the chamber 17 to a point immediately above the burner structure 23. To prevent the combustible mixture from burning in back of the burner structure 23, the velocity of the combustible mixture may be increased at this time so that the velocity through the sleeve 24 is greater than the burning of the mixture. The burning of the combustible mixture in the chamber 17 heats the heating and contacting particles to a very high temperature. The temperature in the lower end of the chamber 17 directly above the burner structure 23 is about 2600° F. or greater. This temperature is intended to be the maximum temperature which may be obtained from the burning of a combustible mixture containing natural gas as a fuel gas. The temperature at the upper end of the chamber 17 is considerably lower, since the intensity of the flame is greatest immediately above the burner structure. The pressure of the combustible mixture in the fitting 36, when proper operating temperature is attained, is about four pounds per square inch, and it is obvious that a pressure will be applied to the body of fluid 134 in the steel tube 116 of the precipitator 110 which will force the water level downward into a position indicated at 140 in Fig. 1.

The next step is the treating or reaction time of the method. The controller 78 which acts as a timing device moves into the position illustrated in the drawings. The electric circuits to the valves 51, 52 and 53 are broken and the electric circuits to the valves 54 and 137 are completed. This changes the positions of the valves, opening the valves 54 and 137 and closing the valves 51 to 53 inclusive. Reaction gas at this time flows through the reaction gas-line 49 and into the chamber 17. The reaction gas in this disclosure of the invention is raw natural gas such as may be obtained in large quantities in the oil fields of any oil producing locality. The following is a typical analysis of natural gas obtained from wells in Southern California:

| | | |
|---|---|---|
| $CO_2$ | 0.72% | Carbon dioxide |
| $O_2$ | 1.23% | Oxygen |
| $C_nH_{2n}$ | 1.69% | Ethylene and higher homologues |
| $N_2$ | 0.00% | Nitrogen (assumed) |
| $C_2H_6$ | 15.44% | Ethane |
| $CH_4$ | 80.90% | Methane |
| | 99.98% | Total |

The reaction gas in entering the chamber 17 comes in contact with the heating and contacting particles 29 and is warmed in the upper end of the chamber. At the central part of the chamber the natural gas becomes hot, and when it reaches the lower end of the chamber immediately above the burner structure where the temperature is the greatest, the natural gas is cracked. The cracking of the natural gas forms acetylene gas $C_2H_2$, and carbon particles which are deposited on the heating and contacting particles 29. The natural gas when cracked is also permanently increased in volume.

The treated gas passes through the burner structure 23 and the pipe 118 into the upper end of the tube 116 where it is suddenly chilled by the washing action of the wash-fluid and reduced to such a temperature that the acetylene gas becomes stable. The treated gas passes downward through the tube 116 where it is subjected to the action of the electric field which operates to remove any solid and liquid particles from the gas. The electric field causes the particles carried by the treated gas to move outward into contact with the inner surface of the tube 116. The solid or liquid particles consist essentially of tar, oil, and carbon. Wash-fluid is supplied to the inner surface of the tube 116, as previously described, at a rate of about two cubic feet per hour. The wash-fluid is preferably water and contains about 9.1 cubic inches of kerosene to every two cubic feet of wash-fluid. The purpose of the kerosene is principally to soften the tar. The treated gas when it passes into the tube 116 forces the water entirely from the lower end of the tube. Opening the valve 137 the treated gas passes from the lower end of the tube 116 and bubbles upward through the body of wash-fluid 134. The treated gas passes from the upper end of the tank 111 through the treated gas delivery line 136. The chemical analysis of the treated gas is substantially different from the analysis already given of the natural gas from which the treated gas was formed. The following is a typical analysis of the treated gas which passes through the treated gas delivery line 136:

| | | |
|---|---|---|
| $CO_2$ | 0.70% | Carbon dioxide |
| $O_2$ | 0.46% | Oxygen |
| $C_nH_{2n}$ | 7.47% | Ethylene and homologues |
| $H_2$ | 29.65% | Hydrogen |
| $CO$ | 1.69% | Carbon monoxide |
| $CH_4$ | 51.20% | Methane |
| $N_2$ | 3.91% | Nitrogen |
| $C_2H_6$ | 0.00% | Ethane |
| $C_2H_2$ | 4.93% | Acetylene |
| | 100.01% | |

The recovery of the acetylene gas from the treated gas is not a part of this invention and may be recovered in any of the various well known manners. The acetylene gas, for instance, may be recovered by refrigeration under pressure, by absorption in a solution of cuprous-chloride in ammonia which forms a solid copper carbide from which acetylene can be liberated in pure form by action of a suitable acid or potassium cyanide, or by a selective solution in acetone using suitable pressure and temperature variations.

With the ending of the reaction time of the apparatus a complete cycle has been performed and a new cycle is commenced. The valves change into opposite positions; that is, into the positions first mentioned. At the changing of the positions of the valves there is a momentary release of pressure. At this time the valve 137 will close the lower end of the tube 116 and prevent the wash-fluid from filling this tube. When the pressure is again established, the fluid level inside the tube 116 is as illustrated at 140 in Fig. 1. It will be seen that if it were not for the valve 137 the tube 116 might fill with fluid to the same level as in the space around the tube 116 in the tank 111. This would result in a shorting of the tube 116 and the wire electrode 122. If the wash-fluid were permitted to fill the tube 116, it would be forced down when the combustible mixture pressure is again established, thus allowing combustible mixture to enter the tube 116 and mix with the treated gas. As it is, the water level 140 is below the upper end of the bar insulator 124. When the combustible mixture passes into the lower end of the chamber 17 it is immediately ignited and the carbon deposited in a previous operation is burned, and the heat value thereof is utilized. For this reason it is desirable to have a small excess of air in the combustible mixture so that the carbon will be effectively burned out.

In the normal operation of the apparatus the acetylene gas yield varies between four and six percent according to the several rates of gas flow and the time length of the fuel time and the reaction time. The following data gives a number of different tests carried out under different conditions:

| Test No. | Air flow | Gas flow | Fuel flow | Gas time | Fuel time | Cycle time | Increase ratio | $C_2H_2$ percent | Fuel/$C_2H_2$ |
|---|---|---|---|---|---|---|---|---|---|
| 214 | 240. | 300. | 20. | 4.66"+9.52"= | 14.18" | 1.283 | 5.06 | 2.09 |
| 234 | 240. | 240. | 20. | 8.29 | 14.29 | 22.58 | 1.360 | 5.03 | 2.10 |
| 261 | 300. | 360. | 25. | 7.43 | 15.15 | 22.58 | 1.354 | 4.78 | 2.19 |
| 266 | 300. | 360. | 25. | 5.99 | 16.59 | 22.58 | 1.516 | 6.00 | 2.12 |

In the foregoing data the definitions have certain meanings which are as follows:

1. All flows are given in cubic feet per hour, ditto volumes.
2. Gas time means seconds duration of the time during which the reaction gas is flowing through the apparatus in the acetylene-making part of the cycle. It does not mean the length of time during which any unit quantity of said reaction gas is being kept hot.
3. Fuel time means seconds duration of the time during which the fuel stream is actually being passed through the highly heated zone during the heating period.
4. Time ratio is proportion of heating time to reaction time.
5. Cycle is sum of one heating time and one reaction time.
6. Cycle time is time in seconds.
7. Increase ratio is ratio of treated gas—volume (including acetylene) to volume of gas run through (raw gas). This gas on cracking undergoes permanent increase in volume.
8. $\dfrac{Fuel}{C_2H_2}$ means cubic feet fuel required per one cubic foot pure acetylene formed which measures the fuel economy of the test.

The experiments show that the percentage of acetylene gas produced increases in proportion to an increase in temperature. The experiments also show that there is a fairly well defined maximum temperature that is soon reached, an excess of combustible raising this maximum temperature but little. I have found that it is possible to obtain a higher temperature in the chamber 17 by preheating the air and I therefore utilize the air heater 41. It is probable that the yield of acetylene gas may be increased by decreasing the size of the carborundum particles 29 so that a larger area of contact may be procured.

There are a number of important features and advantages of the invention which may be elicited from the foregoing description.

It should be apparent that considerable economy is effected in the invention due to the direct manufacture of the acetylene gas as distinguished from the ordinary method of obtaining the acetylene gas from a previously mentioned carbide. The direct manufacture of the acetylene gas reduces the energy input and eliminates lime losses. The treated gas after the acetylene gas has been separated from it may be sold and there will be no loss in this respect. Natural gas is very cheap and I prefer to use this in preference to other hydrocarbon gases although it is possible to do so. Economy is effected by using the heat value of the carbon deposited in the furnace during the reaction time, by the use of an excess of air in the combustible mixture.

The apparatus by which the method may be carried on is of simple construction, being inexpensive to construct and inexpensive in upkeep. The method may be carried out at substantially atmospheric pressure.

The surface combustion method of heating the carborundum crystals 29 is highly desirable because it avoids the problem of heat transfer through the walls of the chamber 17. This conduces to an economy in fuel consumption and also to an economy of fuel time (the time required for heating the particles 29). A further advantage of surface combustion is that it is possible to offer the maximum temperature where it is needed; that is, inside the chamber 17 and not around the walls thereof.

The use of carborundum for the tube 15 and the particles 29 is important to the invention. There are many materials which are suitable in ordinary furnaces but cannot be used in my invention either because they destroy the acetylene when formed or cannot stand the high variable temperatures.

The precipitator is an important part of the invention since it serves the purpose of chilling the treated gas to such a temperature at which the acetylene gas is stable and also of removing solid or liquid particles from the treated gas.

I claim as my invention:

1. A method of producing acetylene gas from natural gas comprising: heating refractory particles to in excess of 2600° F.; passing said natural gas into contact with said heated particles so as to form acetylene gas; and cooling the resulting gas as quickly as possible to a temperature at which acetylene is stable.

2. A method of producing acetylene gas from a reaction gas containing a substantial proportion of paraffine hydrocarbons comprising: passing combustible mixture into a treating chamber; igniting said combustible mixture in said treating chamber in order to heat refractory particles therein to about 2600° F.; and passing reaction gas into contact with said heated particles so as to form acetylene gas, and then suddenly chilling said gases at a rate which is quicker than that at which acetylene decomposes.

3. A method as defined in claim 2 in which said reaction gas is a natural gas.

4. A method of producing acetylene gas from a reaction gas comprising: heating a combustion-supporting gas; mixing said combustion-supporting gas with a fuel gas, thus forming a combustible mixture; passing said combustible mixture into a treating chamber; igniting said combustible mixture in said treating chamber in order to heat particles therein to a temperature in excess of 2600° F.; passing reaction gas containing a substantial proportion of higher hydrocarbons into contact with said heated particles so as to form acetylene gas; and cooling the treated gas to substantially atmospheric temperature at a rate which is quicker than that at which acetylene decomposes.

5. A method of producing acetylene gas from natural gas comprising: heating particles of carborundum to a temperature of approximately 2600° F.; passing said natural gas into contact with said heated particles of carborundum so as to form acetylene gas; and cooling the resulting gas at a rate which is quicker than that at which acetylene decomposes and to a temperature at which acetylene is stable.

In testimony whereof, I have hereunto set my hand at Los Angeles, California, this 6th day of January, 1927.

ROBERT G. WULFF.